United States Patent [19]
Stobb

[11] 3,825,134
[45] July 23, 1974

[54] METHOD FOR BUNDLING, TRANSPORTING, AND FEEDING SHEETS

[76] Inventor: Anton R. Stobb, R.D. 1, Pittstown, N.J. 08867

[22] Filed: Apr. 9, 1973

[21] Appl. No.: 348,976

Related U.S. Application Data

[62] Division of Ser. No. 159,329, July 2, 1971, Pat. No. 3,739,924.

[52] U.S. Cl............. 214/152, 214/6 C, 214/6 H, 214/8.5 A, 271/3.1, 271/215
[51] Int. Cl........................ B65g 57/03, B65g 59/08
[58] Field of Search ............ 214/6 R, 6 C, 6 H, 6 P, 214/6 DK, 6 A, 8.5 R, 8.5 A, 652, 654, 152; 271/3.1, 215

[56] References Cited
UNITED STATES PATENTS

| | | | |
|---|---|---|---|
| 1,801,997 | 4/1931 | Boettcher | 214/6 C |
| 2,684,165 | 7/1954 | Hill | 214/654 |
| 2,705,084 | 3/1955 | Willfond | 214/654 |
| 2,933,314 | 4/1960 | Stobb | 271/215 |
| 3,416,679 | 12/1968 | Stobb | 214/8.5 A |

Primary Examiner—Robert J. Spar
Assistant Examiner—Leslie J. Paperner
Attorney, Agent, or Firm—Arthur J. Hansmann

[57] ABSTRACT

Method for bundling, transporting, and feeding sheets of paper which are preferably in a folded or signature form to be assembled and form a magazine, book, or the like. The sheets are handled by a delivery device, such as a folding machine, and are placed into discrete stacks which are subjected to a compressing device. The stack is formed at an inclined angle and a clamp is applied to the compressed stack. The clamp is shown to have rollers which permit the clamped stack to be wheeled to a transport device such as a cart which is shown. The cart with a plurality of the clamped stacks is then moved to a feeding device which receives the clamped stack in an inclined attitude, and the clamp is removed from the sheets and the sheets are then singly fed into the feeding device which causes the sheets to be collated into an assembled magazine or book. The clamp is shown to be of two extendable and contractable pieces which have a self-locking device for holding the clamp in the contracted position when it is clamping the sheets, and the locking device is releasable when the stack is released in the feeding device.

3 Claims, 10 Drawing Figures

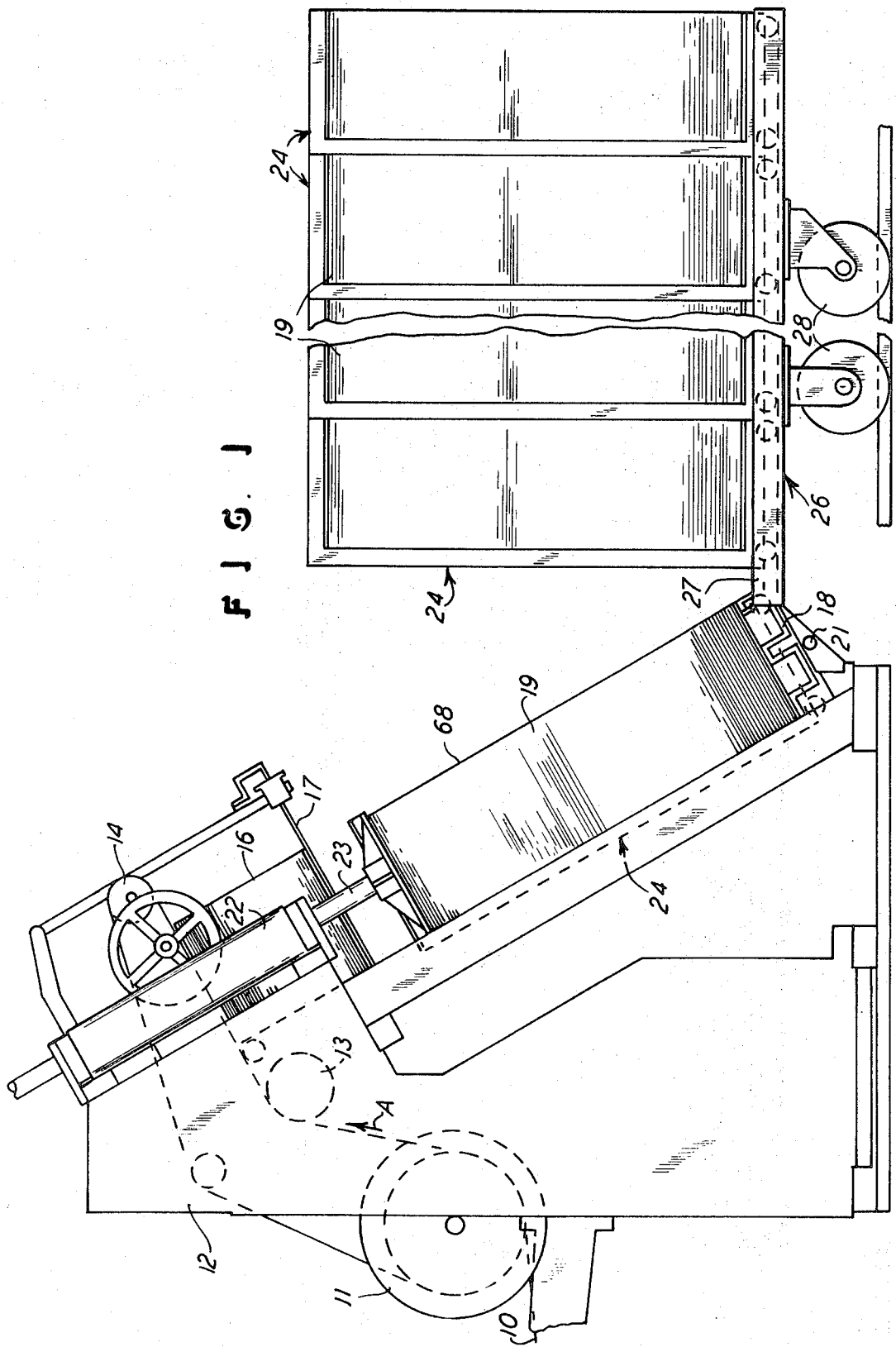

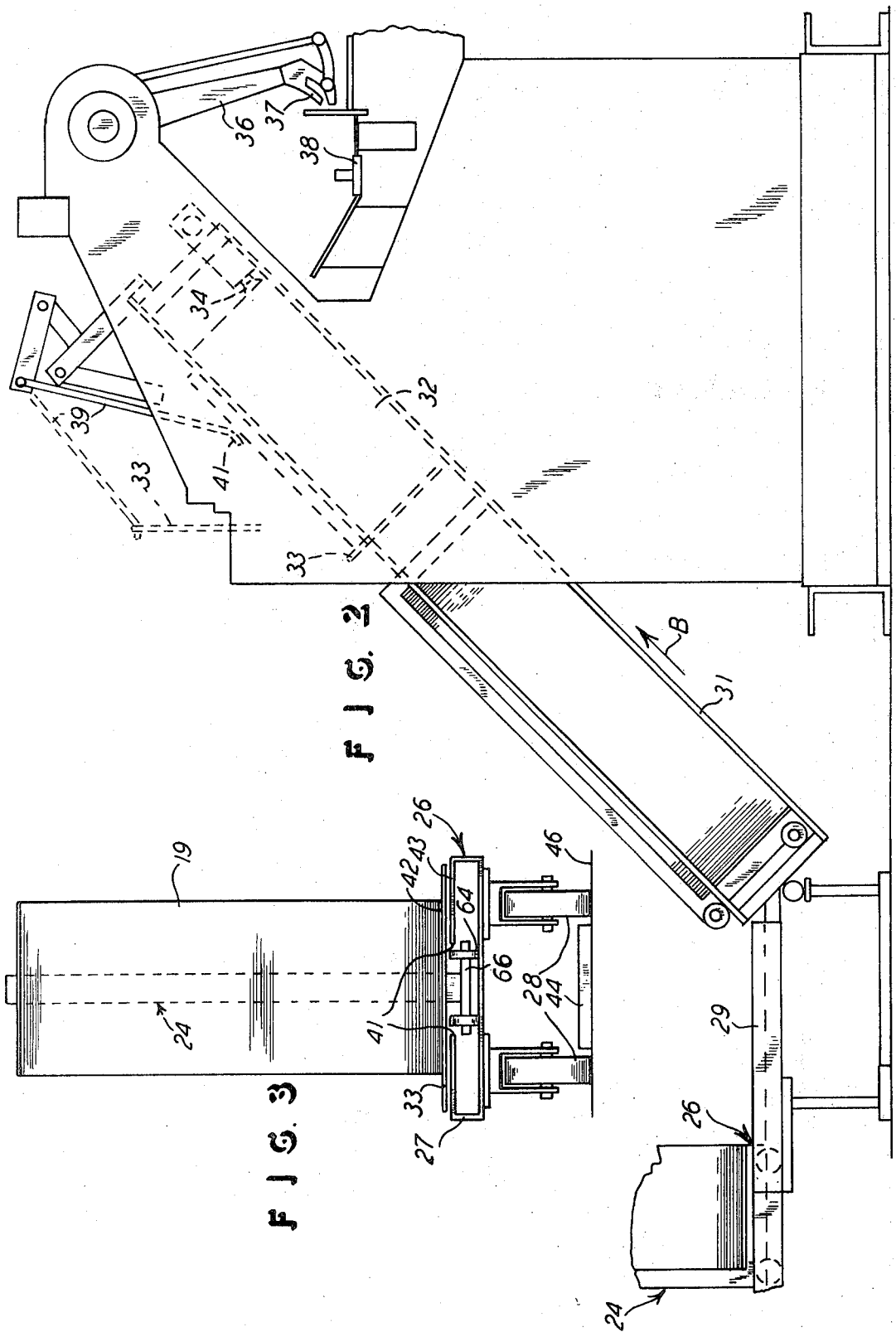

PATENTED JUL 23 1974 3,825,134
SHEET 3 OF 3
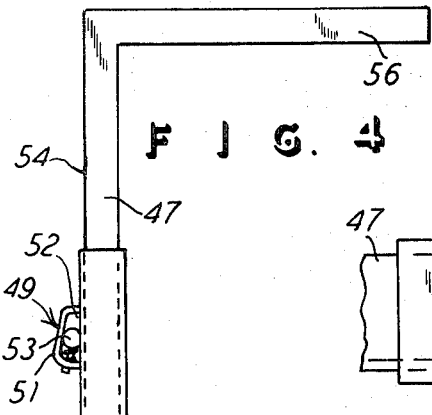
FIG. 4
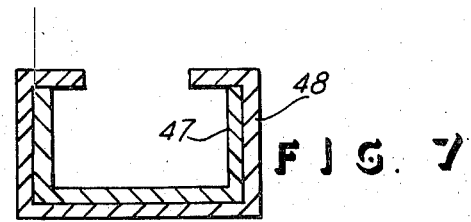
FIG. 7
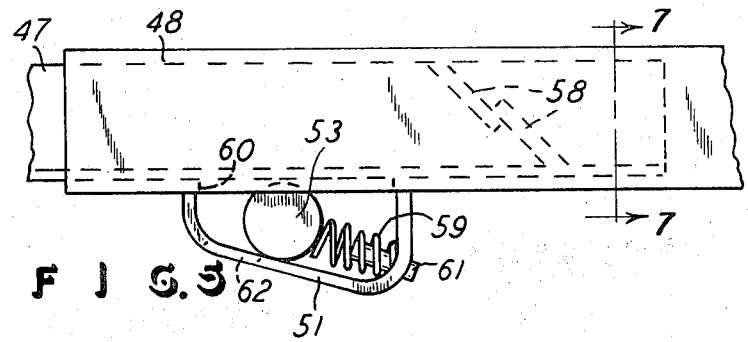
FIG. 5
FIG. 9
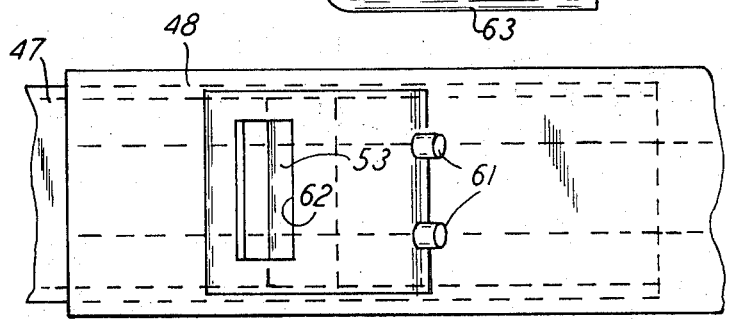
FIG. 6
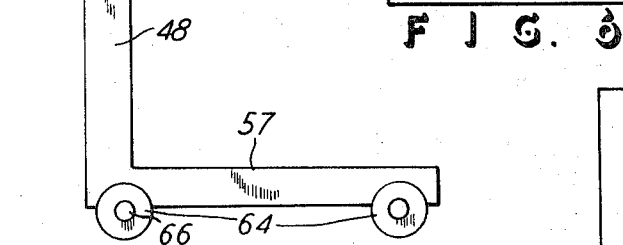
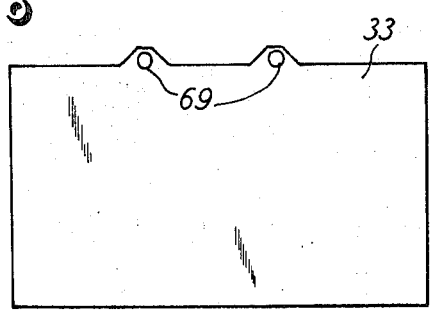
FIG. 8
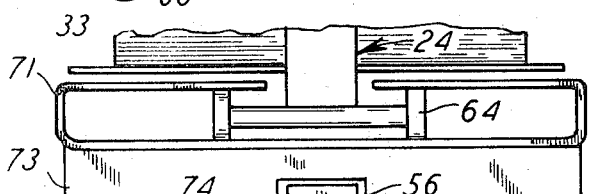
FIG. 10
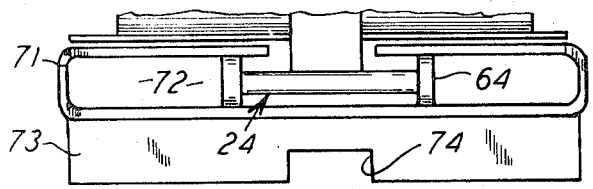

METHOD FOR BUNDLING, TRANSPORTING, AND FEEDING SHEETS

This invention relates to a method for bundling, transporting, and feeding sheets such as printed sheets which are folded in a signature form and are to be collected in forming a magazine, book, or the like. This is a division of U.S. Pat. application Ser. No. 159,329, filed July 2, 1971, and now U.S. Pat. No. 3,739,924.

BACKGROUND OF THE INVENTION

The printing industry is fully aware of the problems in handling the sheets when they come off the high-speed printing presses which are in common use today. The presses deliver printed sheets onto conveyors or tables or the like and the sheets must then be handled and re-arranged or assembled to form the final magazine or book or whatever is the end result. Sheet collecting devices are commonly used for handling the sheets as they are delivered or deposited from the printing presses, and the problem and concern is to obtain equipment which will adequately handle the sheets at the high speed that the press is delivering the sheets. These sheets are commonly delivered to a folding machine which folds the sheets in the manner in which they are commonly seen in magazines, books, or the like, and such folded sheets are the signatures which are assembled to form the completed magazine or book. One example of a prior art device which receives printed sheets and assembles them in a compressed stack is shown in the present inventor's U.S. Pat. No. 2,933,314 in that it shows a stack formed at an inclined angle and it shows the method and apparatus for compressing a stack of sheets.

However, after the stack of sheets is compressed, whether or not the sheets were in folded or unfolded form, it is still of concern that the stack of sheets be bundled or bound and then transported to a feeding device where the sheets are separated out of the stack and are individually placed on a conveyor or other apparatus used in assembling the individual sheets from various stacks of different sheets and to ultimately form the assembled magazine. Heretofore, the compressed stack of sheets would be manually handled, and even manually bound, and then transported to the feeding device where they were placed in the feeding device for the collating function described above. One such example of a prior art device used for receiving a stack and individually removing the sheets therefrom is shown in the present inventor's U.S. Pat. No. 3,416,679.

Thus the industry is concerned with the handling of the sheets so that the sheets can be rapidly collected at the speed they are being produced by the printing press and the sheets can then be stacked, bundled, transported, and positioned in a feeding device. To accomplish these goals is the primary object of this invention, and the present invention does accomplish these goals with a minimum of manual labor and thus a minimum of human effort and a minimum of time.

Therefore, the present invention provides a method for bundling, transporting, and feeding sheets which are first produced by a printing press and which are to be ultimately handled by a feed-device which assembles the sheets in a magazine or book form.

In appraising the present invention, it must also be kept in mind that the stack of sheets normally produced by stacking equipment is relatively heavy and the machine attendant should not be expected nor required to lift the stacks throughout the days work. Further, it is significant to appreciate that the floor space in any plant is important space and must be utilized to its fullest capacity in order to have the plant function at optimum efficiency. In these contexts, the present invention provides the machinery for handling the stacks with only a minimum of human effort required so that no one need be required to fully lift the stacks, and also the equipment requires only a minimum of floor space. For instance, the equipment includes a transportation means, which may be a cart, and the transportation means is arranged to handle a plurality of bundled stacks such that only one trip over the plant floor will transport the plurality of bundled stacks. Further, the transportation means may even be of an overhead nature and thus not be required to move across the plant floor at all.

Another important objective of the present invention is to provide an automated system for receiving, stacking, transporting, and feeding the sheets, as mentioned above, and to have a clamp which can be readily and easily positioned on and removed from the stack of sheets. The clamp of the present invention has a self-locking means thereon such that when the bundle is compressed and the clamp is positioned in tight contact with the opposite ends of the bundle, the clamp will automatically hold itself in that powition until a simple maneuver by the attendant will release the clamp, and this release function is performed when the clamped bundle is finally positioned in the feeder device. Still further, the clamp of this invention has mobilizing means, such as wheels, which permit the clamp to be used as both a clamping device and as a transportation or mobilizing member since the clamped bundle can actually be wheeled across the floor or from position to position, such as shown in this disclosure.

Other objects and advantages will become apparent upon reading the following description in light of the accompanying drawings.

BRIEF DESCRIPTION OF THE DRAWINGS

FIG. 1 is a side elevational view of the delivery device and a fragemnt of the transport device, with both devices having clamped stacks of sheets shown thereon.

FIG. 2 is a side elevational view of a feeding device with a clamped stack of sheets shown thereon.

FIG. 3 is a front elevational view of the transport device with a clamped stack of sheets shown thereon.

FIG. 4 is an enlarged side elevational view of the clamp shown in the previous three figures.

FIG. 5 is an enlarged view of the locking portion of the clamp shown in FIG. 4.

FIG. 6 is a bottom plan view of FIG. 5.

FIG. 7 is a sectional view taken on the line 7—7 of FIG. 5,

FIG. 8 is a side elevational view of a plate which is shown at opposite ends of the stack of sheets in the first three figures.

FIG. 9 is a release member or tool used in releasing the clamp lock means.

FIG. 10 is an elevational view of two stacks, somewhat different.

DETAILED DESCRIPTION OF THE PREFERRED EMBODIMENT AND METHOD

This invention relates to the method, and, as such, it will be described in conjunction with the drawings, and the method will be explained or apparent in the following description.

Between FIGS. 1 and 2, there is shown a delivery device which initially receives the sheets in a stream relation and on a conveyor 10 which is in the form of a belt suitably trained over pulleys or drums, such as the drum 11 which is rotatably supported on the delivery device frame 12. Thus the belt 10 has the sheets laying thereon, and the belt moves in the direction of the arrow A and around a pulley 13 and around a pulley 14. Thus the sheets are carried to the upper end of the delivery device and are stripped from their stream or imbricated relationship and are placed into an aligned stack, such as the fractional stack 16. The sheets are therefore stacked in the inclined direction shown on the delivery device being described, and a lower support plate 17 is suitably connected to the delivery device to slowly continuously move downwardly and to give support to the lower end of the stack 16 as the stack is being formed by sheets entering the top of stack 16 off the belt 10, in the nature shown.

When the stack 16 is of a full size, the plate 17 is then at the bottom in the delivery device and, if a plate 17 has been used, then it can be removed and the pivotal support 18 on the delivery device will receive the bottom of the stack, such as the showing with respect to the full stack 19. The support 18 has a pivot point 21 on the delivery device, and it will therefore be understood that the stack 19, when compressed and clamped as hereinafter described, can be tipped to an upright position about the pivot point 21 and then moved out of the delivery device. A stack compressor 22 is mounted on the delivery device and has a ram 23 which extends along the plane of the incline of the stack 19 and presses downwardly on the stack 19 to press the stack against the pivotal support 18. Of course the stack 19 has been moved sidewise to be offset relative to the stack 16 so that the compressor 22 can operate adjacent another stack 16 which is being formed while the stack 19 is being prepared in the compressing and clamping actions being described.

When the stack 19 is suitably compressed, a bundle clamp generally designated 24 is applied to the stack 19 to hold the stack in the compressed condition. It will of course be understood that the clamp 24 can be applied to the bundle 19 by extending over the opposite ends of the bundle 19 and without interference from either the support 18 or the ram 23, as all of these members can be and are constructed in any suitable manner to provide for their simultaneous contact with the opposite ends of the stack 19, as indicated in FIG. 1. When the clamp 24 is applied to the bundle 19, the compressor 22 is released and the clamped stack can then be moved out of the delivery device and onto a transport device generally designated 26. As mentioned, the movement of the clamped stack 19 from its inclined position and to its upright position on the transport device 26 is accomplished by simply tipping the stack upright and about the pivot point 21, so the stack need not be fully lifted by the attendant. The delivery device and the compressor arrangement or construction described could be similar to that shown in the U.S. Pat. No. 2,933,314.

The transport device 26 includes a bed or support plate 27 and four wheels, such as the wheels 28. Thus the transport device, with a plurality of clamped stacks, can then be moved to a delivery device shown in FIG. 2. The delivery device includes a walk or floor 29 over which the clamped stack can be moved and placed onto an inclined support 31 when the clamped stack is tipped onto the support 31 as shown. The clamp 24 is then removed from the stack 19, and the inclined support 31 is arranged to have a conveyor belt or the like move upwardly in the direction of the arrow B and therefore engage and carry the stack 19 upwardly in the feeding device. Thus, FIG. 2 shows a stack designated 32 which has its clamp 24 removed therefrom and which has moved upwardly in the feeding device. A support plate 33 is shown at the bottom of the stack 32 for engaging the conveyor support 31 and holding the bottom of the stack 32. The feeding device is shown to have a conventional vacuum type sucker 34 and a conventional type of pivotal arm 36 having a sheet or signature gripper 37. Thus the sucker 34 individually picks the sheets from the top of the stack 32 and holds them for the gripper 37 to grasp the raised sheets and swing them from the stack 32 and onto a collector conveyor 38 moving along underneath the gripper 37, all in a manner which may be as shown in U.S. Pat. No. 3,416,679. In the feeding device, a swinging arm 39 has its lower end provided with a finger 41 which can engage the plate 33, if the latter be used in supporting the stack in the feeding device, and the plate 33 is then lifted from the stack and into the raised and dotted position shown in FIG. 2, and, this may be the plate 33 which was at the top of the stack 32. It will also be understood that the arm 39 can be automatically operated in synchronization with the progression of the stack 32 upwardly along the inclined support or on the inclined conveyor 31.

Thus, FIGS. 1 and 2 show the continuous handling and movement of the sheets through and from the delivery device, onto the transport device, to the feeding device and onto the collector conveyor 38. In this apparatus and method described, the attendant is required only to tip the heavy stack of sheets, and he will also apply the clamp 34 at the delivery device, and the clamp is of a self-locking type when it has been applied to the compressed stack 19, and he need then only remove the clamp when the stack moves between the position of the stacks 19 and 32 as shown in FIG. 2. Of course the attendant has operated the transport device 26 for moving a plurality of the clamped stacks from the delivery device and to the feeding device.

The transport device 26 is thus shown to be a wagon or cart which has its bed 27 arranged to stably support the clamped stacks for the transport function. The transport device could also be in the nature of an overhead conveyor where the clamped stacks are placed onto a bed 27 which may be hoisted off the floor and transported overhead through an overhead conveyor system and delivered to the feeding device, in a conventional manner of utilizing an overhead conveyor. However, FIG. 3 shows that the transport device 26 has its bed 27 arranged to stably support the clamped stacks as the lower end of the clamp 24 is received between spaced-apart portions 41 on the bed 27. Thus the bottom 42 of the clamped stack 19, or even the bottom plate 33, if these plates 33 be employed, is spaced slightly above the bed surface 43 so that the clamped stack cannot readily tip off the bed 27. Thus the bed 27 is shown to be in the form of a channel having an opening between the described portions 41 for receiving the bottom portion of the clamp 24. Also, a guide or rail 44 can be affixed to the plant floor 46 for guiding the movement of the transport device over the floor and from the delivery device to the feeding device.

The drawings also show the clamp 24, and FIG. 4 particularly shows the clamp which is generally C-shaped and consists of two L-shaped pieces 47 and 48 which are telescoped together for extension and contraction. The pieces 47 and 48 are boxed-shaped or channel-shaped in cross-section so that they are telescopically related and are self-aligning relative to each other, as shown in FIG. 7. The clamp 24 has a self-locking means 49 which includes a bracket 51 affixed to the side of the piece 48 and presenting a wedge-shaped pocket 52. A roller or circular member 53 is positioned in the wedge pocket 52 and is movable therein and can engage the side 54 of the other channel piece 47. Thus, the wedge pocket 52 and the channel pieces 47 and 48 are arranged so that the clamp legs or ends 56 and 57 can be brought toward each other in a clamp contracted position and they will remain in this contracted position until the lock 49 is released. In this manner, it will now be appreciated that it is an effortless and yet reliable function for the attendant to apply the clamp 24 to the compressed stack 19 in the FIG. 1 position.

FIGS. 5, 6, and 7 show details of the clamp where the two pieces are shown to be telescoped together and secured by the lock means 49 in the fully extended position of the clamp, as determined by two tangs 58, with one on each piece 47 and 48, such that the tangs 58 abut each other and limit further expansion of the clamp. The bracket 51 is welded or otherwise secured to the bottom side of the outer piece 48, and the roller 53 is guided by the bracket 51 which presents the wedge pocket 52 upwardly and toward the bottom side 54 of the clamp piece 56. Thus the roller 53 abuts the piece side 54, and it will be seen and understood that if the pieces 47 and 48 were in a more contracted position, that is, if they were not restricted by the stop or limit tangs 58, the roller 53 would be forced into the small end of the wedge pocket 52 if the pieces 47 and 48 were forced into the expanded position or away from each other. Thus the roller 53 serves as a locking means and prevents expansion or extension of the clamp from any set position since the roller 53 is in mutual contact with the bracket 51 and with the clamp surface 54. A back-up spring 59 abuts a side of the bracket 54 and the roller 53 and is guided on a pin 61 on the bracket 51 so that the roller 53 is urged toward the narrow side of the wedge pocket 52 and thus is always in a locking position when it is under the influence of the compression spring 59. Roller 53 is in opening 60 in piece 48.

The bracket 51 has an opening 62 and a releasing member, such as the tool 63 shown in FIG. 9, can be manipulated and inserted into the opening 62 and against the roller 53 to relieve the roller from its wedged position against the piece surface 54. Thus the locking means can be released by the attendant when it is desired to release the clamp, such as when the clamped stack is in the feeding device, as previously described. FIG. 7 shows that the clamp pieces 47 and 48 are channel or box shaped pieces which are self-aligning and telescoped together, and the adjustable functions and the locking function described are thus achieved with the clamp pieces as shown. The clamp 24 is therefore a reusable clamp which has self-locking means for holding the clamp in the selected maximum extended position, and the locking means can be readily released for removal of the clamp from the compressed stack, when such removal is desired.

The drawings, and particularly FIGS. 3 and 4, show that the clamp has four wheels 64 which are rotatably mounted on the clamp on an axle 66 for each pair of wheels 64, such that the four wheels are provided for each clamp 24. Thus the clamp is mobilized by means of the wheels 64 and the entire clamped stack can thus be easily wheeled and handled, such as moving the stack 19 from its tipped or inclined position in FIG. 1 and onto the transport device 26, and also moving the clamped stack from the transport device 26 and onto the walk 29 in FIG. 2. FIG. 3 then also shows that the clamp wheels 64 and axles 66, along with the clamp mounting leg 57 are all disposed between the transport means bed portions 41, so the clamp bundle is secure on the bed 27. Also, the delivery device tilt portion 18 and the feeding device walk 29 are suitably provided with openings or paths for wheeling the clamped stack along the piece 18 and along the walk 29 for the mobilizing action described.

The sheets are commonly folded signatures as they enter the delivery device shown in FIG. 1, and the folded edge of the signatures is at the side designated 68 in FIG. 1, and this is the side where the clamp is clear or free of the stack so that the stack side 68 is completely open relative to the clamp 24. Then, when the sheets are placed in the feeding device, the folded edge is down against the inclined conveyor 31 so that the gripper 37 can grasp the folded edge of the signatures, as desired. Further, the drawings, and particularly FIG. 8, show the plate 33 which may be provided at the top and the bottom of the stack 19, as seen in FIG. 1. The plate 33 then protects the end signatures from being marred when the compressor is forced onto the stack 19 or when the clamp is applied to the stack 19. The plate 33 has two hook openings 69 which are available for engagement by the lift-arm finger 41, as described in connection with FIG. 2.

The invention is thus of a completely automated method for receiving sheets, preferably in a folded form, and stacking, clamping, transporting, and releasing the clamp and feeding the sheets to a collating mechanism. The method steps will be readily apparent to anyone skilled in the art, and also the claims appended hereto fully define the apparatus, including the clamp, and they also describe the method of handling the sheets in the efficient and automated manner which is the goal of this invention.

FIG. 10 shows an arrangement where there is a slight modification of the truck bed 27 which is shown to be a bed designated 71 having a center opening 72 wherein the clamp wheels 64 can be disposed for securely supporting the clamped stack. Thus it will be understood that the clamp wheels 64 can be rolled right into the bed opening 72, and the clamped stack will then be stable relative to the bed 71. The bed 71 also includes a lower portion 73 which has an opening 74 for nesting with the upper clamp leg 56, as shown in FIG. 10 when two clamped stacks are themselves stacked upon each other, as shown. Thus, the transport device can be the bed 71 which is arranged to securely support the clamped stacks, as shown in FIGS. 3 and 10, and in the FIG. 10 arrangement, the entire bed 71 can be lifted by an overhead hoist means and the transport device is thus provided. Also, as shown in FIG. 10, the stacks can be placed one on top of the other and they will be in stable position relative to the supporting bed 71.

What is claimed is:

1. A method of bundling, transporting and feeding sheets from a delivery device to a feeding device, comprising the steps of positioning said sheets on said delivery device in folded form and in a stack with the folds to one side of the stack, clamping said sheets in the stack and with a clamp having transporting means and having the fold side of the stack being fully exposed relative to said clamp, loading said clamped stack by said transporting means onto a transport device and moving said stack by moving said transport device to a feeder device, positioning said stack by moving said transporting means onto said feeder device in an inclined position with the folds on the underside of said stack, removing said clamp from the stack, and separately removing said sheets from said stack at the fold side of said stack.

2. The method as claimed in claim 1, including the steps of positioning said stack in an inclined position on said delivery device, tipping the clamped stack into an upright position for loading it directly onto said transport device, and tipping the clamped stack onto said feeder device directly from said transport device for positioning said stack onto said feeder device.

3. The method as claimed in claim 1, including the steps of stacking said sheets in an inclined stack on said delivery device, and compressing said sheets in said stack and prior to clamping said sheets with said clamp.

* * * * *